United States Patent [19]
Klug

[11] 3,921,865
[45] Nov. 25, 1975

[54] METERING VALVE

[75] Inventor: Robert F. Klug, Columbus, Nebr.

[73] Assignee: Dale Electronics, Inc., Columbus, Nebr.

[22] Filed: Jan. 30, 1975

[21] Appl. No.: 545,304

[52] U.S. Cl. .............................. 222/447; 222/450
[51] Int. Cl.² ........................................ G01F 11/38
[58] Field of Search ........... 222/447, 445, 450, 227, 222/244, 451, 380, 372; 184/7 D, 7 E; 417/510, 507, 508

[56] References Cited
UNITED STATES PATENTS

| | | | |
|---|---|---|---|
| 2,111,915 | 3/1938 | MacMillin | 222/447 |
| 3,653,466 | 4/1972 | Fujita et al | 184/7 D |

Primary Examiner—Robert B. Reeves
Assistant Examiner—John P. Shannon
Attorney, Agent, or Firm—Zarley, McKee, Thomte & Voorhees

[57] ABSTRACT

A metering valve comprising a housing having upper and lower ends and opposite sides. The housing has a vertically disposed first bore formed therein which extends between its upper and lower ends, the upper end of which is fluidly connected to a source of material to be metered. The lower end of the first bore discharges the metered material into the desired receptacle. The housing is provided with spaced apart, upper, intermediate and lower bores formed therein which are disposed perpendicularly with respect to the first bore and which communicate therewith. Upper, intermediate and lower pistons are movably mounted in the upper, intermediate and lower bores respectively and are reciprocated in their respective bores by air cylinders connected thereto. The upper and lower pistons have annular grooves formed in the periphery thereof which communicate with the first bore when the upper and lower pistons are in a first position relative to the respective bores to permit the material to flow therearound. The intermediate piston moves towards and away from the first bore so as to create a pumping or sucking action.

9 Claims, 8 Drawing Figures

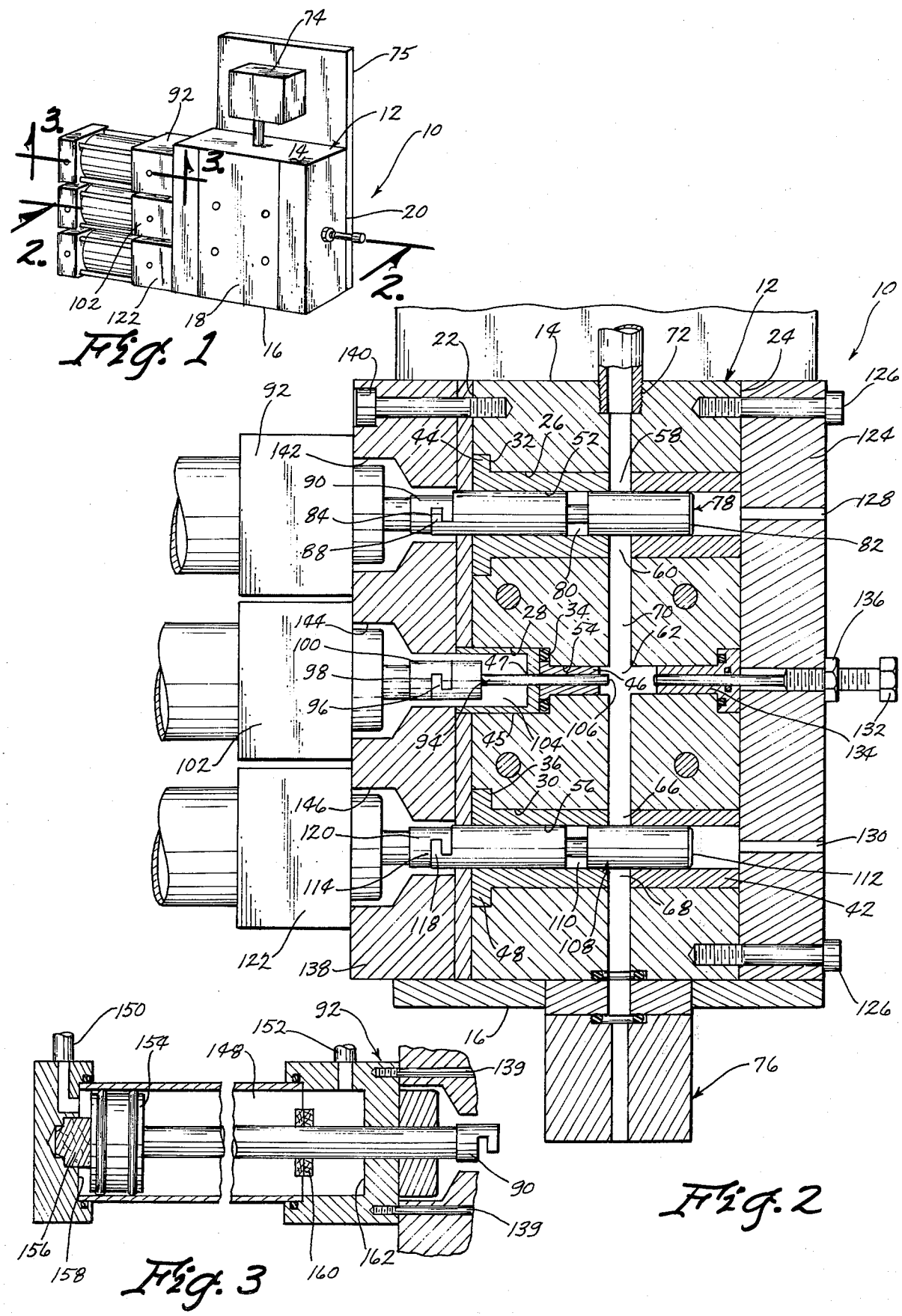

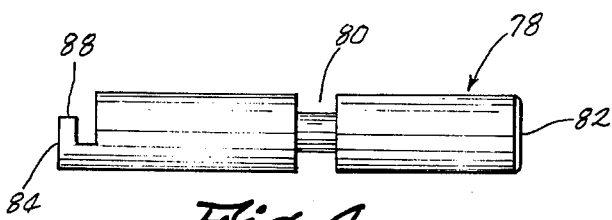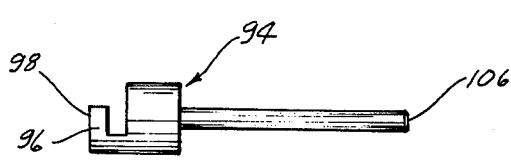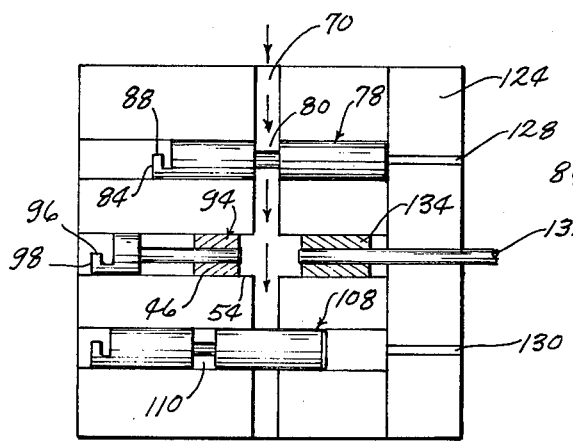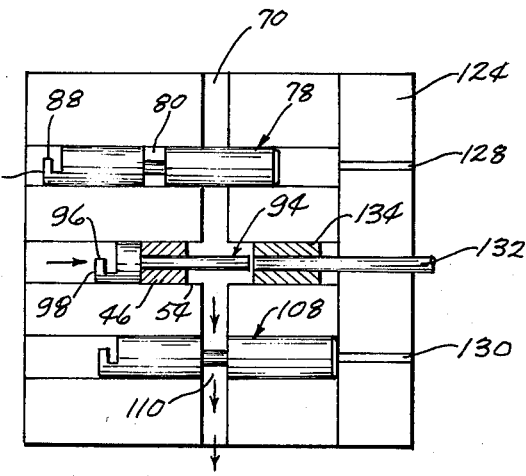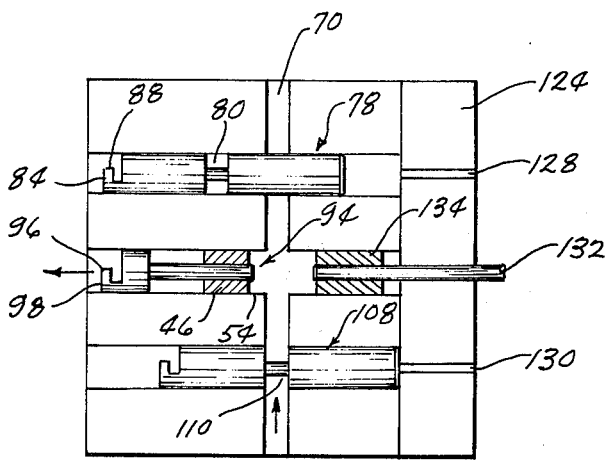

METERING VALVE

BACKGROUND OF THE INVENTION

This invention relates to a metering valve and more particularly to a metering valve wherein independently operated cross-line pistons meter the material passing therethrough. Conventional metering or check valve devices are extremely expensive to manufacture and are not very reliable. One form of the conventional metering valve is of the ball and check type. Such a device suffers the drawback that foreign material interferes with the seating of the ball which results in material leakage. Additionally, the ball and check type valves do not have the ability to draw back the material being dispensed to prevent drool.

Some types of metering valves have been devised wherein the pistons or cylinders are "in-line" with the metering bore but these type of devices are extremely expensive. The in-line type devices are also subject to contamination and do not operate in an efficient manner at all times.

Therefore, it is a principal object of the invention to provide an improved metering valve.

A further object of the invention is to provide a metering dispense valve.

A further object of the invention is to provide a metering valve wherein a plurality of cross-line pistons are provided in a housing to permit precise and efficient metering of material such as oil, grease, epoxy, adhesives or molding compounds.

A further object of the invention is to provide a metering valve having means for providing a positive drawback of the material being dispensed to prevent drool.

A further object of the invention is to provide a metering valve which is not easily contaminated.

A further object of the invention is to provide a metering valve which permits the precise metering of epoxy or liquids into electrical components or the like.

A further object of the invention is to provide a metering valve which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the device:

FIG. 2 is an enlarged partial sectional view as seen on lines 2 — 2 of FIG. 1:

FIG. 3 is an enlarged partial sectional view seen on lines 3 — 3 of FIG. 1:

FIG. 4 is a side view of one of the pistons in the device:

FIG. 5 is a side view of the middle piston in the device; and

FIG. 6, FIG. 7 and FIG. 8 are schematic views illustrating the sequence of operation of the valve.

DESCRIPTION OF THE PREFERRED EMBODIMENT

The metering valve of this invention is referred to generally by the reference numeral 10 comprising a valve body 12 having an upper end 14, lower end 16, front 18, back 20 and opposite sides 22 and 24. Valve body 12 is provided with horizontally disposed bores 26, 28 and 30 formed therein which extend between sides 22 and 24 in a vertically spaced relationship. As seen in the drawings, bores 26 and 30 have annular shoulders 32 and 36 provided therein respectively at one end thereof.

Bushings 38 and 42 are mounted in bores 26 and 30 respectively and have annular flanges 44 and 48 which engage the shoulders 32 and 36 respectively. Bore 28 is provided with annular shoulder 34 at one end thereof which is adapted to receive a bushing 45 therein which has a central opening 47 formed therein as will be described in greater detail hereinafter. Bushing 46 is also positioned in bore 28 as illustrated in FIG. 2. Preferably, the bushings 38 and 42 are mounted in the bores 26 and 30 in a "friction-fit" manner but O-rings may be provided between the bushings and the bores if desired.

Bushings 38 and 42 are provided with longitudinally extending bores 52 and 56 formed therein respectively. Bushings 38 has openings 58 and 60 formed therein which communicate with bore 52 as seen in the drawings. Bushing 42 is provided with openings 66 and 68 formed therein which communicate with bore 56 as also illustrated in FIG. 2.

Valve body 12 is provided with a vertically disposed bore 70 which extends between its upper and lower ends and which communicates with the opening 58, bore 52, opening 60, bore 28 opening 66, bore 56 and opening 68. The upper end of bore 70 is provided with a suitable port 72 which is adapted to be placed in communication with a source of material to be metered referred to generally by the reference numeral 74. The material to be metered may be either pressure fed or gravity fed to the port 72 as desired. Ordinarily, the material will be pressure fed since the viscosity of the metered material would normally be such that gravity feeding would be extremely difficult. The numeral 76 refers to a dispenser nozzle mounted on the lower end of valve body 12 and which is in communication with the lower end of bore 70. FIG. 1 illustrates the device being mounted on a supporting member 75 which does not form a part of the invention.

Cylindrical piston 78 is slidably mounted in bore 52 and is provided with an annular groove 80 formed in its periphery between its ends 82 and 84. If desired, O-rings may be employed on the piston 78 which would embrace the piston and sealably engage the inner wall surface of bore 52. Piston 78 has a finger portion 88 at its end 84 for attachment to the rod 90 of air cylinder 92.

Cylindrical piston 84 slidably extends through the opening 47 in bushing 45 and through the bore in bushing 46 and is received by the bore 28 as illustrated in FIG. 2. Piston 94 is provided with a finger portion 96 at its end for connection to the rod 100 of air cylinder 102. For purposes of description, the piston 94 will also be described as having an end 106.

Cylindrical piston 108 is slidably mounted in bore 56 and is provided with an annular groove 110 formed in its periphery between its ends 112 and 114. Optional O-rings may be mounted on the piston 108 for sealably engaging the inner wall surface of bore 56 if desired. Piston 108 has a finger portion 118 at its end 114 for connection to the rod 120 of air cylinder 122.

Plate 124 is secured to side 24 of valve body 12 by any convenient means such as screws 126 or the like. Plate 124 has openings 128 and 130 formed therein which communicate with bores 52 and 56 respectively. Openings 128 and 130 function as vent openings and also aid in the detection of leaks in the bores 52 and 54. Bolt 132 threadably extends through plate 124 so that its inner end extends into bore 54 as seen in the drawings. The numeral 134 refers to a guide plug which is mounted in bore 54 as seen in FIG. 2. A jam nut 136 is threadably mounted on bolt 132 outwardly of plate 124 to prevent rotational movement of bolt 132 after the inner end of the bolt 132 has been selectively positioned relative to bore 54 and piston 94.

Plate 138 is secured to side 22 by bolts 140 or the like and is provided with vertically spaced openings 142, 144 and 146 formed therein which receive the rods 90, 100, and 120 of cylinders 92, 102 and 122 respectively. Cylinders 92, 102 and 122 are secured to the plate 138 by any convenient means such as by screws 139 or the like which extend outwardly through the plate 138 and which are threadably received by the ends of the air cylinders such as illustrated in FIG. 3.

Inasmuch as each of the cylinders 92, 102 and 122 are identical, only the interior of cylinder 92 will be described in detail. Cylinder 92 is provided with a chamber 148, the opposite ends of which are in communication with air ports 150 and 152. Piston 154 is mounted on rod 92 within chamber 148 and sealably engages the wall surface of chamber 148. Shock pad 156 is mounted on one end of rod 90 which engages the end wall 158 of chamber 148 when the rod 90 is retracted into cylinder 92. Shock pad 160 is mounted on rod 90 within chamber 148 and is designed to engage the end wall 162 of chamber 148 to limit the extension of rod 90. Shock pads 156 and 160 are preferably constructed of a material suitable to cushion or dampen the engagement of the pads with the end walls. The operation of the cylinders 92, 102 and 122 is preferably controlled by a solid state timer with time delays.

The independently operated cross-line pistons are operated in the manner illustrated in FIGS. 6, 7, and 8. Assuming that the material to be metered is supplied to the reservoir 74 under pressure, the material will be supplied to the upper end of bore 70. FIG. 6 illustrates the position of the pistons in the "fill" portion of the cycle. In FIG. 6, it can be seen that annular groove 80 of piston 78 registers with the opening 70 so that the material may pass thereby. In the fill portion of the cycle illustrated in FIG. 6, the piston 94 is adjacent the left side of the bore 54. In other words, the end 106 of piston 94 is positioned in a spaced relationship with respect to the bore 70. In the position of FIG. 6, the piston 108 is in its closed position so that the annular groove 110 does not register with the bore 70. During the fill cycle, the material is injected downwardly into the bore 70 and would fill the bore 70, bore 54 (between bushing 46 and plug 134) to piston 108 which limits further injection.

FIG. 7 illustrates the meter portion of the cycle after the material has been filled or introduced into the valve body (FIG. 6). Piston 78 is moved from the position of FIG. 6 to the closed position of FIG. 7 and piston 108 is moved from its closed position of FIG. 6 to its open position of FIG. 7. The piston 94 is then moved to the right from the position of FIG. 6 which causes the material to be dispensed from the lower end of the bore 70. In other words, the extension of the piston 94 through the bushing 46 into the bore 54 causes a volume of material to be dispensed equal to the volume of the piston 94 introduced into bore 54. The inward movement of the piston 94 is limited by the adjustment bolt 132 which permits the precise amount of material to be metered. Thus, if the displacement of the piston 94 in FIG. 6 is 0.0 centimeters and the displacement of the piston 94 in FIG. 7 is 2.0 centimeters, 2.0 centimeters of material will be dispensed from the valve.

FIG. 8 illustrates the drawback portion of the cycle which also may be referred to the "cut-off or anti-drool" cycle. After the proper amount of material has been metered from bore 70 due to the movement of the various pistons in FIG. 7, piston 78 remains closed and piston 108 initially remains open. Piston 94 moves to the left as illustrated in FIG. 8 to "drawback" a desired amount of fluid. The movement of the piston 94 to the left in FIG. 8 creates a slight suction so that the material is drawn back. After the piston 94 is moved to the left or drawn back in FIG. 8, piston 108 is then moved to its closed position to prevent material from escaping from the lower end of bore 70. The valve is then in position to begin a new cycle.

It can be appreciated that the piston 94 acts much like a pump to initially force material from the bore 70 and then to draw back a certain amount of material to prevent drool of the material which would otherwise result in an inaccurate metering of material. The valve arrangement disclosed herein has a wide range of potential applications in that it is not size or viscosity sensitive. The device is capable of handling material such as oil, grease, epoxy, adhesives, or molding compounds. If desired, the entire valve body can be heated so that the apparatus will function with extremely low viscosity materials.

The cross-line relationship of the pistons with respect to the bore 70 is such that the pistons tend to shear off any foreign material encountered thereby, thereby insuring that the material will be precisely metered. The metering valve of this invention is not only less expensive to manufacture than conventional metering valves but is also more dependable in operation and requires much less maintenance than the prior art devices. Thus it can be seen that the metering valve of this invention accomplishes at least all of its stated objectives.

I claim:

1. A metering valve, comprising,
   a housing having upper and lower ends and opposite sides,
   said housing having a first bore formed therein which extends between its upper and lower ends,
   means fluidly connecting the upper end of said first bore to a source of material to be metered,
   means at the lower end of said first bore for discharging the metered material therefrom,
   said housing having spaced apart upper, intermediate and lower bores formed therein disposed perpendicularily with respect to said first bore and communicating therewith,
   upper, intermediate and lower pistons movably mounted in said upper, intermediate and lower bores respectively,
   upper, intermediate and lower power cylinders operatively connected to said upper, intermediate and lower pistons respectively for moving each of said pistons between first and second positions relative to the respective bores, said upper piston having a cut-away portion formed in its periphery between the ends thereof which communicates with said first bore when said upper piston is in said first position to permit the flow of material in said first bore past said upper piston, said lower piston having a cut-away portion formed in its periphery between the ends thereof which communicates with said first bore when said lower piston is in said first position to permit the flow of material in said first bore past said lower piston, said upper and lower pistons each having piston portions thereon which seal said first bore when said pistons are in their said second positions, said intermediate piston being positioned in said intermediate bore, when in its said second position, in a spaced relation with respect to said first bore and being moved towards said first bore when moving from its said second position to said first position, and control means for operating said power cylinders.

2. The metering valve of claim 1 wherein an adjustable stop means is mounted in said intermediate bore for limiting the movement of said intermediate piston as said intermediate piston is moved to its said first position.

3. The metering valve of claim 1 wherein a plug means is mounted in said intermediate bore and is spaced laterally from said first bore, said intermediate piston slidably extending through said plug means towards said first bore.

4. The metering valve of claim 3 wherein said intermediate piston comprises a cylindrical member which is movable into said intermediate bore to displace material therein when moving to its said first position.

5. The metering valve of claim 4 wherein said cylindrical member and said plug means cooperate to create a suction action on the material in said first bore when said intermediate piston is moving from its said first position to its said second position to prevent drool of the material from the lower end of said first bore.

6. The metering valve of claim 1 wherein said housing has first and second vent openings formed in one side thereof which provide communication between one end of said upper and lower bores and the atmosphere respectively.

7. The metering valve of claim 1 wherein each of said power cylinders comprises a cylinder body having a chamber provided therein defined by opposite end walls, a piston slidably mounted in said chamber and having a rod secured thereto and extending outwardly from said chamber through one of said end walls into one of said upper, intermediate and lower bores, said piston in said bore being operatively secured to said rod for movement therewith, and shock pad means in said chamber for cushioning the movement of said piston therein.

8. The metering valve of claim 7 wherein said shock pad means comprises a first shock pad on the other end wall adapted to be engaged by said piston and a second shock pad on said rod adapted to engage said one end wall.

9. The metering valve of claim 1 wherein said upper and lower pistons have sealing means thereon for sealing said first bore means when in their said first positions.

* * * * *